United States Patent

Gillich

[11] Patent Number: 5,856,020
[45] Date of Patent: Jan. 5, 1999

[54] ALUMINUM SURFACES FOR TECHNICAL LIGHTING PURPOSES

[75] Inventor: Volkmar Gillich, Neuhausen, Switzerland

[73] Assignee: Alusuisse Technology & Management Ltd., Switzerland

[21] Appl. No.: 547,799

[22] Filed: Oct. 25, 1995

[30] Foreign Application Priority Data

Nov. 24, 1994 [CH] Switzerland ............................ 3543/94

[51] Int. Cl.$^6$ ................................................. B32B 15/04
[52] U.S. Cl. ........................ 428/469; 428/472; 428/472.2
[58] Field of Search ................................ 428/469, 472.2, 428/472; 362/341; 359/838

[56] References Cited

U.S. PATENT DOCUMENTS

| | | | |
|---|---|---|---|
| 4,131,518 | 12/1978 | Fromson .................................. | 428/469 |
| 4,379,196 | 4/1983 | Halper ..................................... | 428/213 |
| 5,116,674 | 5/1992 | Schmidhalter et al. ................. | 428/335 |
| 5,403,657 | 4/1995 | Textor ..................................... | 428/336 |
| 5,582,863 | 12/1996 | Textor ..................................... | 427/162 |

FOREIGN PATENT DOCUMENTS 0495755  7/1992  European Pat. Off. .

OTHER PUBLICATIONS

Applied Optics, vol. 17, No. 3, Feb. 1, 1978, pp. 333–334 for Aluminum Mirrors Al$_2$O$_3$–Protected, with High Reflectance . . . .

Applied Optics, vol. 32, No. 25, Sep. 1, 1993, pp. 4843–4845 for Analytical Solutions for Zero–Phase–Shift Transparent Coatings . . . .

*Primary Examiner*—Timothy Speer
*Attorney, Agent, or Firm*—Bachman & LaPointe, P.C.

[57] ABSTRACT

Reflector for technical lighting purposes, having a reflecting surface of aluminum and a protective, transparent, pore-free barrier layer of aluminum oxide produced by anodizing having a dielectric constant $\epsilon$ of 6 to 10.5 at 20° C., where the barrier layer is of thickness d that either satisfies the condition a) for constructive interference:

$$d \cdot n = k \cdot \lambda/2 \pm 20 \text{ nm}$$

or b) for achieving a color-toned reflector surface:

$$[k \cdot \lambda/2 + 20 \text{ nm}] < d \cdot n < [(k+1) \cdot \lambda/2 - 20 \text{ nm}]$$

or c) for using as starting material to produce reflectors with LI/HI multi-layer coatings that increase reflectivity.

$$d \cdot n = l \cdot \lambda/4 \pm 20 \text{ nm}$$

where n is the refractive index of the barrier layer, $\lambda$ is the average wave length of the light striking the surface of the reflector, k is a natural number and l is a natural number that is uneven. The thickness of the barrier layer lies between 60 and 490 nm and does not vary by more than ±5% over the whole of the aluminum surface.

9 Claims, 1 Drawing Sheet

ALUMINUM SURFACES FOR TECHNICAL LIGHTING PURPOSES

BACKGROUND OF THE INVENTION

The present invention relates to a reflector for technical lighting purposes, having a surface of aluminum which is protected from physical and chemical effects by a protective layer of aluminum oxide, and relates also to its use and to a process for its manufacture.

Reflectors with brightened surfaces of high purity aluminum or AlMg alloys are known for the purpose of reflecting light in a directional or diffuse manner. In order to achieve lasting brightness, the brightened surfaces are normally protected by an organic or inorganic coating or by an oxide layer. The oxide layers may be produced by chemical or anodic oxidation. Organic coatings may be produced by paint-type coatings, powder coatings or by laminating or coating with a plastic foil. Inorganic coatings may be made by PVD (physical vapor deposition), CVD (chemical vapor deposition), enamelling or plasma coating.

A widely used practice for manufacturing reflector surfaces is the deposition of very thin, high purity PVD Al layers on glass; such layers are usually protected by a layer of e.g. $PVD-Al_2O_3$, $PVD-SiO_2$ or a paint-type layer. Because of the thinness of the layer, PVD-Al layers generally cannot be anodized. Deposition of $PVD-Al_2O_3$ or $PVD-SiO_2$ layers is however expensive and, because of the homogeneity required to achieve good reflecting properties, the deposition of paint-type layers is complicated. Furthermore, paint-type layers generally exhibit only modest mechanical properties such as resistance to scratching, and often poor stability with respect to UV-radiation.

Another protective layer often used today for reflector surfaces is made by anodic oxidation utilizing direct current in a sulphuric acid electrolyte. The resultant protective layer exhibits a uniform layer thickness but, as a result of the process itself, exhibits high porosity. Anodic oxidation in sulphuric acid electrolytes is normally called a dc process. To achieve sufficient reflectivity using that method, the aluminum surfaces that are to serve as the reflector surfaces are normally brightened chemically or electrolytically, and subsequently protected by a transparent protective layer e.g. by a dc process. The concentration of sulphuric acid in the dc process is typically 20 wt %, the electrolyte temperature 15° to 30° C., the applied voltage 12 to 30V and the current density 1 to 3 $A/dm^2$. The thickness of layer achieved is typically 1 to 10 $\mu$m; the layers obtained are colorless to yellowish.

The oxide layer produced by the dc process is generally comprised of two layers viz., a pore-free, very thin base or barrier layer and a porous outer layer. The pores are produced as a result of the oxide layer being partially re-dissolved, chemically, at the surface exposed to the electrolyte. The total thickness of the oxide skin reaches its upper limit when growth and dissolution are balanced, which depends on the composition of the electrolyte, the current density and the temperature of the electrolyte.

In order to achieve adequate protection from corrosion, the porous layers produced by the dc process have to be sealed. This is normally carried out using boiling water (>96° C.) or water vapor (>98° C.). During this hydrothermal sealing the aluminum oxide swells as a result of absorbing water and the pores are closed. In the process a part of the aluminum oxide is transformed to aluminum monohydrate.

On sealing in boiling water or steam, however, often an undesired, tightly adherent sealing deposit (so called smut) is formed. As a result of atmospheric effects this smut leads to disturbing deposits which are matt to iridescent and lead to interference colors. For that reason the sealing deposits have to be removed by abrasive means. One possibility for preventing such sealing deposits is to employ special sealing baths.

The only anodic oxide layers produced in sulphuric acid that are colorless and clear are those produced on high purity aluminum and AlMg or AlMgSi alloys with high purity aluminum (> or=99.85 wt % Al). In most construction alloys, as a result of heterogeneous precipitates present in the structure, more or less cloudy oxide layers are formed. Also, in most alloys, if the heat treatment is unfavorable, precipitation occurs in the structure leading to grey discoloration such as e.g. spots due to local thermal effects.

In the case of most protective surface layers produced on aluminum using the dc process, said layers for reflectors typically being 1 to 10 $\mu$m thick, and in particular in the case of less pure materials such as e.g. Al 99.85, Al 99.8 or Al 99.5, alloying elements such as e.g. Fe-rich or Si-rich intermetallic phases may be incorporated in the oxide layer leading to undesired absorption or scattering of light i.e. the light is reflected at various angles. As a result, the technical characteristics of reflected light after the brightening treatment i.e. values such as e.g. the total reflectivity or the directional reflectivity, are influenced in a detrimental manner.

Due to the large thickness of the oxide layers produced by a and integral to, the dc process, the reflectivity of the surface is reduced by the absorption and scattering of light. Finally, the oxide layer in the normal thickness range of 1 to 3 $\mu$m often exhibits disturbing interference effects, so called iridescence.

SUMMARY OF THE INVENTION

The object of the present invention is to avoid the above mentioned disadvantages and to propose reflectors for technical lighting purposes that possess at least one surface, or parts at least of one surface, that enable incident light to be reflected with as little loss of reflectivity as possible.

That objective is achieved by way of the invention in that the reflector for technical lighting purposes has an aluminum surface and a protective, transparent, pore-free barrier layer of aluminum oxide produced by anodizing that exhibits a dielectric constant $\epsilon$ of 6 to 10.5 at 20° C., where the barrier layer is of thickness d that either satisfies the following condition a) for constructive interference:

$$d \cdot n = k \cdot \lambda/2 \pm 20 \text{ nm}$$

or b) for achieving a color-toned reflector surface:

$$[k \cdot \lambda/2 + 20 \text{ nm}] < d \cdot n < [(k+1) \cdot \lambda/2 - 20 \text{ nm}]$$

or c) for using as starting material to produce reflectors with LI/HI multi-layer coatings that increase reflectivity.

$$d \cdot n = l \cdot \lambda/4 \pm 20 \text{ nm}$$

where n is the refractive index of the barrier layer, $\lambda$ is the average wave length of the light striking the surface of the reflector, k is a natural number and l is a natural number that is uneven, the thickness of the barrier layer lies between 60 and 490 nm and does not vary by more than ±5% over the whole of the aluminum surface. At the same time it must be taken into account that, because of dispersion, the refractive index n is dependent on the wave length i.e. in the present text n always refers to the corresponding wave length of the light striking the surface of the reflector.

The aluminum surfaces required for the reflectors according to the invention may concern surfaces of aluminum parts, strips, sheets or foil, also aluminum outer layers on items made from composite materials, in particular aluminum outer layers on composite panels, or aluminum layers deposited—for example electrolytically—on any material. In a preferred version the item featuring the aluminum surface concerns a workpiece of aluminum which has been manufactured e.g. by a rolling, extrusion, forging or impact extrusion methods.

When referring to the material aluminum in the following text, this is to be understood as including all grades of purity and all aluminum alloys. In particular the term aluminum includes all rolling, wrought, casting, forging and extrusion alloys of aluminum. The aluminum surfaces may be of high purity aluminum alloys having a purity of 99.99 wt % Al and higher, for example a clad material, or exhibit a purity of 99.5 to 99.99 wt % Al. The aluminum surfaces of the reflectors according to the invention preferably exhibit a purity of less than 99.99 wt % Al, in particular a purity of 99.5 to 99.98 wt % Al. Especially preferred are aluminum surfaces exhibiting a purity of 99.8 to 99.98 wt % Al.

The barrier layers on the reflectors according to the invention exhibit on aluminum surfaces of purity 99.5 to 99.98 wt % Al essentially no changes in technical lighting characteristics compared to the surface properties of the original aluminum surface, i.e. the condition of the surface of the aluminum, as it was e.g. after brightening, is to a large extent retained after the barrier layer is formed. To be taken into account here, however, is that the metal purity of the surface layer can indeed have an influence on the resultant brightness, as a with respect to the brightening of aluminum surfaces, it is known that the lower the purity of the aluminum, the poorer is the brightness obtained, and with that also the poorer the reflective properties.

The aluminum surfaces may have any shape and may also be structured. In the case of rolled aluminum surfaces, these may be treated e.g. by high finish or designer rolls. A preferred use of structured aluminum surfaces is e.g. in reflectors used for daylight lighting, in particular structured surfaces with structure sizes of 0.1 to 1 mm.

The barrier layer exhibits a constant thickness and does not vary by more than ±5% over the whole of the aluminum surface. This makes it possible for the first time to employ reflectors for almost loss-free reflection of electromagnetic waves in technical lighting applications, as for the first time, the reproducible, uniform thickness of the barrier layer permits reflectors to be used e.g. for reflection with constructive interference or to achieve exactly defined color tones.

DETAILED DESCRIPTION OF PREFERRED EMBODIMENTS

Figure 1:
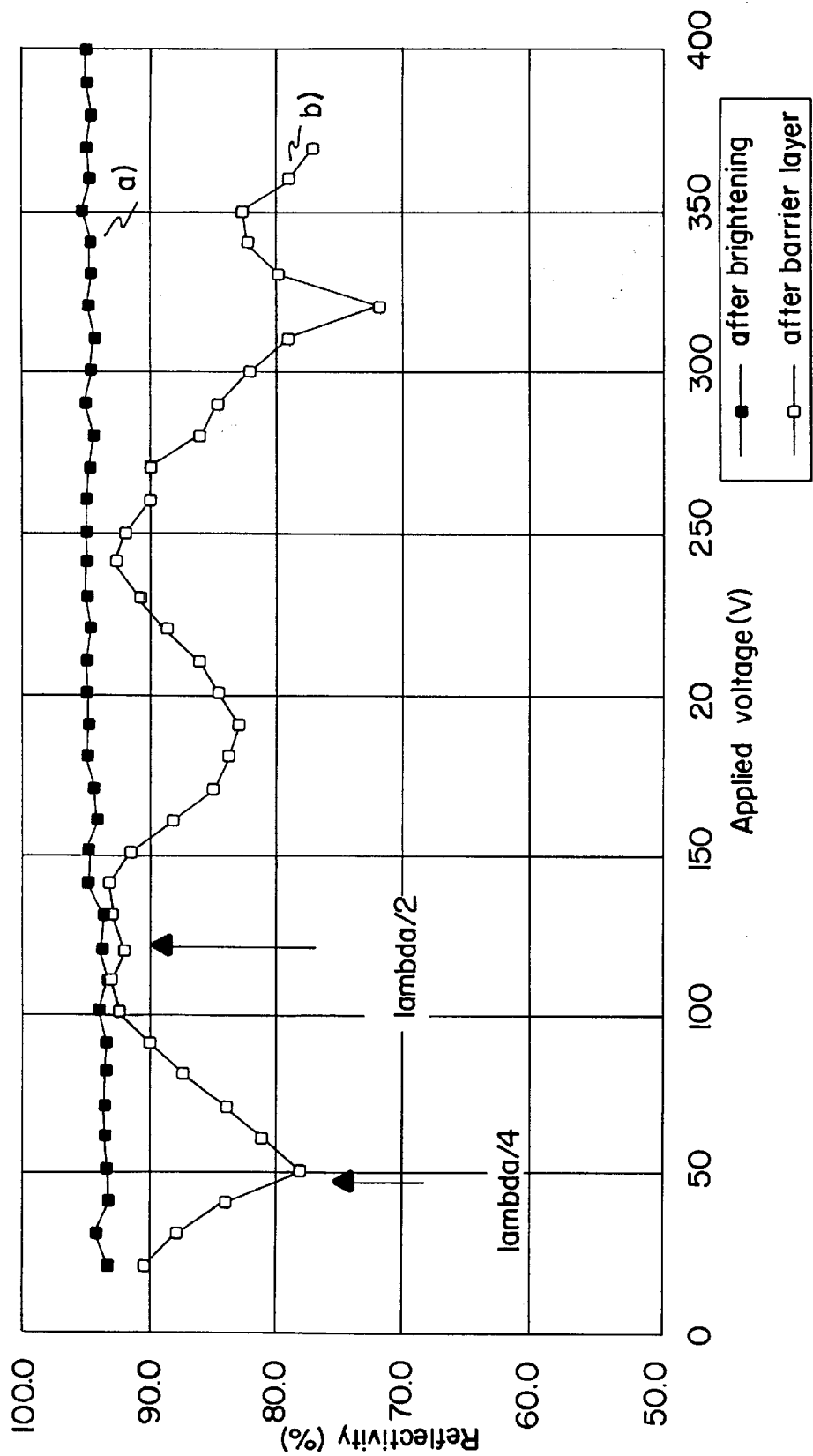
FIG. 1 shows a comparison of the directional reflectivity of a brightened aluminum surface with that of a brightened aluminum surface of the same purity bearing a 150 nm thick barrier layer.

In order that, in the first place, constructive interference can occur and, secondly, the absorption of light in the barrier layer is as small as possible, it is essential to the invention that a transparent barrier layer is provided for the electromagnetic waves to be reflected. A further essential feature of the reflectors according to the invention concerns the absence of pores in the barrier layer.

The barrier layer must be pore-free in order that as little as possible of the light penetrating the barrier layer is absorbed and any diffuse scattering of the light which may arise due to the presence of pores, which is difficult to control, is also kept to a minimum. By the term pore-free is to be understood not absolutely pore-free, but rather that the barrier layer of the reflector according to the invention is essentially pore-free. Important in that respect is that the aluminum oxide layer produced by anodizing exhibits essentially no pores as a result of the process, which means, no pores e.g. due to the use of electrolytes that dissolve aluminum oxide. In the case of the present invention the pore-free barrier layer in particular exhibits a porosity of less than 1%.

The dielectric constant E of the barrier layer depends, among other things, on the process parameters employed during anodizing to create the barrier layer. In accordance with the invention the dielectric constant $\epsilon$ of the barrier layer produced at 20° C. lies between 6 and 10.5, preferably between 8 and 10.

In the case of reflectors according to the invention the thickness of the barrier layer is preferably chosen such that the reflector surface enables constructive interference of the reflected light to be achieved. The condition for constructive interference can be described as $d \cdot n = k \cdot \lambda/2$, where $d \cdot n$ is the optical layer thickness, n is the refractive index, $\lambda$ is the average wave length of the light striking the reflector surface and k is a natural number. It must be noted that the condition for constructive interference described by the equation $d \cdot n = k \cdot \lambda/2$ is exactly valid only for light striking the reflector surface perpendicularly.

With regard to the thickness of the barrier layer, it was found in the course of the activities concerning the invention that the properties of reflection run essentially periodically, viz., such that with increasing layer thickness, in particular in the case of layers with optical layer thickness $d \cdot n$ greater than $3\lambda/2$, the reflection properties are unsuitable for technical lighting purposes. Preferred therefore are layers with a thickness that enable constructive interference of the reflected light to be achieved and k is a natural number, preferably 1, 2 or 3, and 1 or 2 are particularly preferred. In the interest of the reflection properties the thickness of the barrier layer on reflectors according to the invention preferably lie in the range of 60 to 490 nm (nanometers); especially preferred is the range 75 to 320 nm.

In the course of the work associated with the invention it was found that reflectors containing aluminum oxide surfaces with barrier layers of thickness that satisfies the condition for constructive interference and lie in the range $d \cdot n = k \cdot \lambda/2 \pm 20$ nm exhibit essentially the same good reflection properties.

The refractive index n of the barrier layer usefully lies between 1.55 and 1.65. Highly preferred is for the wavelength $\lambda$ to correspond to the average wavelength that can be percepted best by the human eye during daylight, which lies approximately at 550 mm.

In a preferred version of the reflector according to the invention the barrier layer is created such that it has a thickness d which fulfills the requirements for constructive interference $d \cdot n = k \cdot \lambda/2 \pm 20$ nm and absorbs less than 3% of the incident light.

In the course of the activities concerning the invention it was found that barrier layers on brightened aluminum surfaces with a constant, uniform layer thickness over the whole of the reflector surface obtain a uniform color tone, if the layer thickness d is chosen such that:

[$k \cdot \lambda/2 \pm 20$ nm]$< d \cdot n <$[$(k+1) \cdot \lambda/2 - 20$ nm]

In contrast to most layers containing colorant, these color tones are fast to light. Furthermore, it is possible to intensify or eliminate the color effects by using a polarization filter.

In a further version of the reflector according to the invention the barrier layer is of thickness d according to the conditions $d \cdot n = l \cdot \lambda/4 \pm 20$ nm where l is an uneven natural number. Such reflectors are suitable as starting material for producing reflectors with reflection-improving LI/HI-multilayers, i.e. LI/HI-multiple layers. By LI/HI-multilayers is meant low/high-index-multilayers i.e. multiple layers made up of at least two layers, with different refractive indices. The combination of pairs of dielectric layers with different refractive indices on a metal surface such that the layer with the lower refractive index is on the metal surface, enables an improvement in reflective properties compared with those of a single uniform layer. For a given layer composition, the highest reflectivity can be achieved when the thickness of the individual layers equals $\lambda/4$ or an uneven multiple thereof With regard to the composition of the layer material, the best reflection properties are obtained when the difference between the refractive indices of the individual layers is as great as possible.

The thickness of the barrier layer according to the invention is small in comparison to an oxide layer produced by dc anodizing. As a result, the former exhibits only few foreign particles that act as scattering centers for the light. Further, in the case of the reflectors according to the invention, the linearly dependent absorption of incident light is small; as a result an increase in reflectivity is obtained over that of known reflectors with, for example, oxide layers produced by the dc process, especially if the thickness of the barrier layer is chosen such that constructive interference occurs. In comparison with oxide layers produced by dc anodizing, barrier layers on reflectors according to the invention are not affected by foreign particles such as e.g. particles of Fe, Si, AlFeSi, i.e. such particles incorporated in the barrier layer do not have a strong influence on light absorption that affects the total reflectivity, nor on the scattering of incident light. Furthermore, because of the small thickness of the barrier layer, the amount of light scattered at bent edges, especially those resulting from cracks in the oxide layer, is normally negligibly small.

The normally large difference in layer thickness produced by the dc process causes selective light absorption and with that iridescence problems. On the other hand, the small and according to the invention very constant thickness of barrier layer over the reflector surface, causes no iridescence (rainbow colors). Furthermore, due to the thickness of the barrier layer, the spacing of the reflection planes leading to iridescence effects is too small. In the case of dc layers, the reflection plane spacings lie in the range of the wavelength of the incident light, with the result that iridescence can occur.

As a result of strong absorption by the oxide layer in the infra-red range, reflectors bearing oxide layers made by dc anodizing partially exhibit only moderate reflectivity, which makes them unsuitable for infra-red reflectors. In comparison, the reflectors according to the invention exhibit no significant absorption of infra-red waves up to a thickness of about 10 μm.

Also, if the reflectors according to the invention are subjected to further processing, they exhibit the significant advantage over known, state-of-the-art reflectors that e.g. on bending no visible cracks i.e. no shiny edges are formed.

The following table 1 shows a comparison of typical reflectivity characteristics, in particular the fractions of directionally and scattered refection values for a brightened aluminum surface without a barrier layer and brightened aluminum surfaces of different purities having a 150 nm thick barrier layer. The brightened aluminum surface without a barrier layer has a purity of 99.9 wt % Al. The brightened aluminum surfaces of the reflectors with a barrier layer are of 99.50, 99.9 and 99.98 wt % Al. The reflectivity values in table I were measured according to the German Industrial Standard DIN 5036 and represent a technical lighting characteristic i.e. the measured reflectivity values are weighted according to the sensitivity of the eye to light. As can be seen from the values obtained, the reflectivity is diminished only by a minimal amount by the barrier layer.

TABLE 1

|  | Total reflection | Directional reflection | Scattered reflection |
| --- | --- | --- | --- |
| Al 99.9, brightened | 92.6% | 88.3% | 4.3% |
| Al 99.5%, brightened, with barrier layer | 88.3% | 76.3% | 12.0% |
| Al 99.9, brightened, with barrier layer | 92.0% | 87.4% | 4.6% |
| Al 99.8, brightened, with barrier layer | 92.0% | 90.5% | 1.5% |

The present invention relates also to a process for producing reflectors for technical lighting purposes, featuring a surface of aluminum which is protected by a transparent, pore-free barrier layer of given thickness made of aluminum oxide produced by anodizing, having a dielectric constant $\epsilon$ of 6 to 10.5 at 20° C. and varying by not more than ±5% over the whole of the aluminum surface.

That object is achieved by way of the invention in that the aluminum surface is oxidized electrolytically in an electrolyte that does not re-dissolve the aluminum oxide layer, and the desired thickness d of the resulting oxide layer, measured in nm (nanometers) is arrived at by choosing and setting a constant electrolyte voltage U in volts selected according to the following criteria $d/1.4 \leq U \leq d/1.2$ where d/1.4 and d/1.2 represent quotients with d as the numerator and 1.4 and 1.2 the denominator.

The process according to the invention permits thin, homogeneous and, with respect to electromagnetic radiation at least in the visible range, transparent barrier layers of uniform thickness to be manufactured. When light in a medium such as e.g. air spreads out and enters another medium e.g. aluminum oxide in which the velocity of propagation of the light is different (a different index of refraction), a fraction of the light striking the surface will be reflected back. Therefore, in order to achieve a reflector with uniform reflectivity characteristics over the whole surface, it is necessary to have homogeneous layers of uniform thickness.

In the electrolytic process according to the invention at least the aluminum surface to be oxidized is provided with a previously specified, defined surface condition, then placed in an electrically conductive fluid, an electrolyte, and coupled up as the anode to a dc source where the negative electrode is normally stainless steel, graphite, lead or aluminum. According to the invention, the electrolyte is such that the aluminum oxide formed during the electrolytic process does not dissolved chemically i.e. the aluminum oxide does not re-dissolve. In the dc field gaseous hydrogen is formed at the cathode and gaseous oxygen at the anode. The oxygen formed at the aluminum surface reacts with the aluminum so that the thickness of the oxide layer increases during the process. As the resistance of the layer increases rapidly with increasing thickness of the barrier layer, the flow of current decreases accordingly and the layer stops growing.

The production of reflectors according to the invention requires a clean aluminum surface, i.e. the surface that is to be oxidized electrolytically normally has to be subjected to surface treatment, a so called pre-treatment, prior to the process according to the invention.

Aluminum surfaces normally exhibit an oxide layer that is formed naturally and, because of its previous history, is contaminated with foreign material. Such foreign material may e.g. be rolling lubricant residues, protective oils for transportation purposes, corrosion products or pressed in foreign particles and the like. To remove such foreign material, the aluminum surfaces are normally pre-treated chemically with cleaning agents that attack the surface. Suitable for that purpose, apart from acidic aqueous degreasing agents, are in particular alkaline degreasing agents based on poly-phosphate and borate. Pickling or etching with strongly alkaline or acidic solutions such as e.g. caustic soda or a mixture of nitric acid and hydrofluoric acid cause moderate to pronounced attack and removal of material. As a result, the natural oxide layer and all impurities incorporated in it are removed. Aggressive alkaline attack often produces deposits which have to be removed by an acidic after-treatment. Cleaning without removal of surface material is effected by degreasing with organic solvents or an aqueous or alkaline cleaning agent.

Depending on the state of the surface it may also be necessary to remove the surface by mechanical means viz., by abrasive materials. Such a treatment may be carried out e.g. by grinding, surface blasting, brushing or polishing, if necessary supplemented by a chemical after-treatment.

In the plain metal condition aluminum surfaces exhibit a very high capacity for reflection of light and heat, whereby the smoother the surface, the greater is the directional reflectivity and the shinier the surface. Maximum brightness is achieved with high purity aluminum and special alloys such as e.g. AlMg or AlMgSi.

A highly reflecting surface is achieved e.g. by polishing, milling, rolling with highly polished rolls in the final roll pass, or by chemical or electrolytic brightening. Polishing may be accomplished e.g. using a buffing wheel of soft cloth and, if desired, employing a polishing paste. When polishing by rolling, it is possible in the last roll pass also to impress a given structure into the aluminum surface e.g. using engraved or etched steel rolls or a material bearing a given structure that is placed between the roll and the material being rolled. Chemical brightening takes place e.g. by using a highly concentrated acid mixture at high temperatures, normally over about 100° C. Acidic or alkaline electrolytes may be employed for electrolytic brightening; acidic electrolytes are normally preferred.

In order to maintain the bright finish, the brightened surface must be protected from chemical and physical effects. The known state-of-the-art methods for this, such as dc anodizing or coatings of paint exhibit the above mentioned disadvantages such as large and difficult-to-control layer thickness or inhomogeneous layers.

The process according to the invention provides homogeneous barrier layers of uniform thickness that are essentially transparent in the visible range so that the light can be reflected at the barrier layer/aluminum interface.

Producing barrier layers electrolytically according to the process of the invention permits exact control over the thickness of the barrier layer. The maximum thickness, in nanometers nm, of barrier layer obtained with the process according to the invention corresponds approximately to the applied voltage in volts (V) i.e. the maximum layer thickness is a linear function of the voltage applied for anodizing. The exact value of the maximum barrier layer thickness achieved as a function of the applied voltage U can be determined by a simple trial and lies between 1.2 and 1.4 nm/V—the exact value of the thickness as a function of the applied voltage being dependent on the electrolyte used i.e. its composition and its temperature.

By employing an electrolyte that does not re-dissolve the barrier layer, these layers are almost pore-free i.e. any pores that occur are due e.g. to contaminants in the electrolyte or structural faults in the outer aluminum layer, but hardly due to the aluminum oxide dissolving in the electrolyte. As the electrical resistivity of the oxide layer increases markedly during the formation of the oxide layer, much higher voltages are required than in the dc process.

Non-re-dissolving electrolytes that may be employed in the process according to the invention are e.g. organic or inorganic acids, as a rule diluted with water and having a pH value of 2 and more, preferably 3 and more, in particular 4 and more and 7 and less, preferably 6 and less, in particular 5.5 and less. Preferred are electrolytes that may be processed cold i.e. at room temperature. Especially preferred are inorganic or organic acids such as sulphuric or phosphoric acids at low concentrations, boric acid, adipinic acid, citric acid or tartaric acid or mixtures thereof, or solutions of ammonium or sodium salts of organic or inorganic acids, in particular the above mentioned acids and mixtures thereof. The said solutions exhibit a concentration in total of 20 g/l or less, usefully 2 to 15 g/l of ammonium or sodium salt dissolved in the electrolyte. Very highly preferred are solutions of ammonium salts of citric or tartaric acid or sodium salts of phosphoric acid.

A very highly preferred electrolyte contains 1 to 5 wt % tartaric acid to which e.g. an appropriate amount of ammonium hydroxide ($NH_4OH$) may be added to adjust the pH to the desired level.

As a rule the electrolytes are aqueous solutions.

The maximum possible anodizing voltage is determined by the dielectric value of the electrolyte. This depends for example on the composition and temperature of the electrolyte and usually lies in the range of 300 and 600V.

To increase the dielectric value of the electrolyte, alcohol may be added as another solvent to it. Especially suitable for that purpose are methanol, ethanol, propanol such as e.g. poly-propyl-alcohol or iso-propanol or butanol. The amount of alcohol to be added to the electrolyte is not critical, so that the quantitative ratio of electrolyte to solvent may be e.g. 1:50. By adding alcohol the dielectric value of the electrolyte may be increased e.g. to 1200V. For the process according to the invention, however, alcohol-free electrolytes are preferred.

The optimum temperature for the process according to the invention depends on the electrolyte employed; in general, however, it is of secondary importance for the quality of the barrier layer obtained. Temperatures of 15° to 40° C., in particular temperatures between 18 and 30° C., are preferred for the process according to the invention.

The process according to the invention is particularly suitable for producing barrier layers continuously or on parts of coils, sheets, foils or items out of aluminum, and on composite materials having at least an outer layer of aluminum. As such it has been found that using aluminum of a purity equal to or greater than 99.5 wt % has no significant effect on the quality of the barrier layer i.e. the surface condition present after the brightening the aluminum surface remains essentially the same after forming the barrier layer.

The process according to the invention is particularly suitable for electrolytic oxidation of the aluminum surface in a continuous process employing e.g. a treatment line, for example a strip anodizing process.

The process according to the invention exhibits the following advantages over state-of the-art dc anodizing:
- negligible consumption of electrolyte, as the aluminum oxide is not re-dissolved and the concentration of salts is normally very low (up to approx. 20 g/l)
- no sealing required
- low consumption of electric current In the dc process, as a result of the aluminum oxide re-dissolving, an enrichment of aluminum in the electrolyte takes place, which correspondingly increases the consumption of electrolyte. Further, the electrolyte for dc anodizing requires a high concentration of acid i.e. up to 200 g/l. In contrast to this, the concentration of salts in the electrolyte for the process according to the invention is very small i.e. up to approx. 20 g/l. Consequently the process according to the invention results in only little incorporation of electrolyte constituents in the oxide layer.

Producing a 2 m $\mu$m thick oxide layer by anodizing via the dc process results in a current consumption of approx. 35,000 A/m$^2$, in contrast to this, the consumption of current using the process according to the invention to produce a typical barrier layer of 150 nm is only approx. 2,500 A/m$^2$.

Producing oxide layers with the dc process requires very pure aluminum in order to prevent absorption or diffuse scattering of light by the insoluble particles embedded in the thick oxide layer or to prevent undesired iridescence due to interference effects; in the case of oxide layers produced by the process according to the invention, by selecting the appropriate thickness of barrier layer, such layers can be produced free of iridescence even with less pure aluminum.

Reflectors according to the invention find preferential use in lamps for technical lighting purposes, especially in functional lamps e.g. for workplaces with computer monitor screens, secondary lighting, spotlamps, or lighting elements such as light deflecting lamellae.

A preferred use for the reflectors according to the invention is for decorative lamps especially color-tone lamps, or decorative surfaces e.g. on ceiling or wall elements.

The reflectors according to the invention are also preferably employed for producing color tones that are dependent on the angle of illumination and/or angle of observation.

A further preferred use of the reflectors according to the invention is in their use as starting material for producing reflection intensifying LI/HI multilayers. Required for that purpose are Al$_2$O$_3$ barrier layers of thickness k×$\lambda$/4±20 nm, where $\lambda$ is the average wavelength of the light striking the reflector surface and k is an uneven natural number.

Suitable HI-layers (high-index layer) for deposition on the barrier layer according to the invention with an index of refraction of 1.6 are e.g. layers of titanium dioxide (TiO$_2$) with a refractive index of approx. 2.5, praseodymium—titanium-oxide (Pr—Ti-oxide), lanthanum—titanium-oxide (La—Ti-oxide), ZnS or CeO$_2$. Preferred, however, are HI-layers of TiO$_2$, Pr—Ti-oxide or La—Ti-oxide. The HI-layers may be deposited e.g. using PVD methods or by decomposition of organic compounds containing the desired metal oxides (e.g. via CVD methods).

EXAMPLE

The aluminum surface employed was plain, rolled aluminum of 99.9 wt % purity which was subjected to the following pre-treatment:
1) Degreasing by boiling for 5 minutes
2) Rinsing
3) Neutralizing in HNO$_3$ (concentration HNO$_3$:H$_2$O=1:1)
4) Rinsing
5) Rinsing in H$_2$O and deionised H$_2$O
6) Immersion in a bath of ethanol
7) Drying with hot air After the pre-treatment, the aluminum surface is brightened according to the following procedure:
1) Immersion in a bath of cold electrolyte
2) Electrolyzed in H$_3$PO$_4$/H$_2$SO$_4$ (specific gravity 1.755) for 60 sec. at 16V
3) Rinsing in H$_2$O at 60° C.
4) Removal of the electrolyte deposit in NaOH (100 g/l) at 50° C. for 3 sec.
5) Rinsing
6) Neutralizing in HNO$_3$ (concentration HNO$_3$:H$_2$O=1:1)
7) Rinsing in H$_2$O and deionised H$_2$O
8) Immersion in a bath of ethanol
9) Drying with hot air The brightened aluminum surface was then anodized in citric acid at a concentration of 1 g/l at room temperature; the applied voltage was initially 20V and this was increased continuously at a rate of 20 V/min. After increasing the voltage by 10 V the directional reflectivity of the aluminum surface bearing the barrier layer was measured each time at an angle of 20° to the surface normal using the method according to DIN 67530 i.e. in comparison to an Al mirror, where the reflectivity of the mirror represents 100%. The residual current, measured during electrolysis over the whole voltage range from 20 to 370 V, was less than 15 mA/dm.

FIG. 1 shows a comparison of the directional reflectivity of a brightened aluminum surface of 99.9 wt % Al with that of a brightened aluminum surface of the same purity bearing a 150 nm thick barrier layer. Plotted along the ordinate axis in FIG. 1 are the reflectivity values measured according to DIN 67530, and along the abscissa the voltage applied for electrolysis. Curve a) shows the reflectivity values measured on the brightened aluminum surface, and curve b) shows the reflectivity values measured on the brightened aluminum surface bearing the barrier layer. In each case the reflectivity values are given as the % of that of a standard mirror i.e. glass plate with aluminum vapor deposited on it and protected by a layer of SiO$_2$. Also shown in FIG. I are the measured reflectivity values for barrier layer thicknesses at which the optical layer thickness amounts essentially to $\lambda$/4 (lambda/4) and essentially $\lambda$/2 (lambda/2).

I claim:

1. Reflector for technical lighting purposes, which comprises a reflector having a reflecting surface of aluminum and a protective, transparent, pore-free barrier layer of aluminum oxide produced by anodizing having a dielectric constant $\epsilon$ of 6 to 10.5 at 20° C., where the barrier layer is of thickness d that satisfies at least one of the following conditions:

a) for constructive interference:

$$d \cdot n = k \cdot \lambda/2 \pm 20 \text{ nm},$$

b) for achieving a color-toned reflector surface:

$$[k \cdot \lambda/2 + 20 \text{ nm}] < d \cdot n < [(k+1) \cdot \lambda/2 - 20 \text{ nm}], \text{ and}$$

c) for using as starting material to produce reflectors with LI/HI multi-layer coatings that increase reflectivity:

$$d \cdot n = 1 \cdot \lambda/4 \pm 20 \text{ nm},$$

where n is the refractive index of the barrier layer, λ is the average wavelength of the light striking the surface of the reflector, k is a natural number and 1 is a natural number that is uneven, the thickness of the barrier layer lies between 60 and 490 nm and does not vary by more than ±5% over the whole of the aluminum surface.

2. Reflector according to claim 1, wherein the aluminum surface has a purity of 99.5 to 99.98 wt. %.

3. Reflector according to claim 1, wherein the thickness of the barrier layer is between 75 and 320 nm.

4. Reflector according to claim 1, wherein λ corresponds to the average wavelength of light that can be best seen by the human eye during daylight.

5. Reflector according to claim 1, wherein the barrier layer has a thickness d that satisfies the condition for constructive interference:

$$d \cdot n = k \cdot \lambda/2 \pm 20 \text{ nm},$$

and absorbs less than 3% of the energy of the incident light.

6. Reflectors according to claim 1, wherein the barrier layer exhibits a thickness d that satisfies the condition:

$$d \cdot n = k \cdot \lambda/2 \pm 20 \text{ nm}$$

where k is a natural number, for at least one of lamps in technical lighting applications, lamps in daylight, functional lamps for workplaces with computer monitor screens, secondary lighting, spotlamps, light deflecting elements and light deflecting lamellae.

7. Reflectors according to claim 1, where the barrier layer exhibits a thickness d, that satisfies the condition:

$$[k \cdot \lambda/2 + 20 \text{ nm}] < d \cdot n < [(k+1) \cdot \lambda/2 - 20 \text{ nm}],$$

where k is a natural number, for decorative lamps or the decorative surfaces of ceiling or wall elements.

8. Reflectors according to claim 1, where the barrier layer exhibits a thickness d, that satisfies the condition:

$$d \cdot n = 1 \cdot \lambda/4 \pm 20 \text{ nm},$$

where 1 is an uneven natural number, as starting material for manufacturing LI/HI-multilayer barrier layers that increase reflectivity.

9. Reflectors according to claim 1, where the barrier layer exhibits a thickness d, that satisfies the condition:

$$[k \cdot \lambda/2 + 20 \text{ nm}] < d \cdot n < [(k+1) \cdot \lambda/2 - 20 \text{ nm}],$$

where k is a natural number, for producing color tones that are dependent on at least one of the angle of illumination and the angle of observation.

* * * * *